L. THOMAS.
COAL CUTTING MACHINE.
APPLICATION FILED MAR. 19, 1910.
993,474.
Patented May 30, 1911.
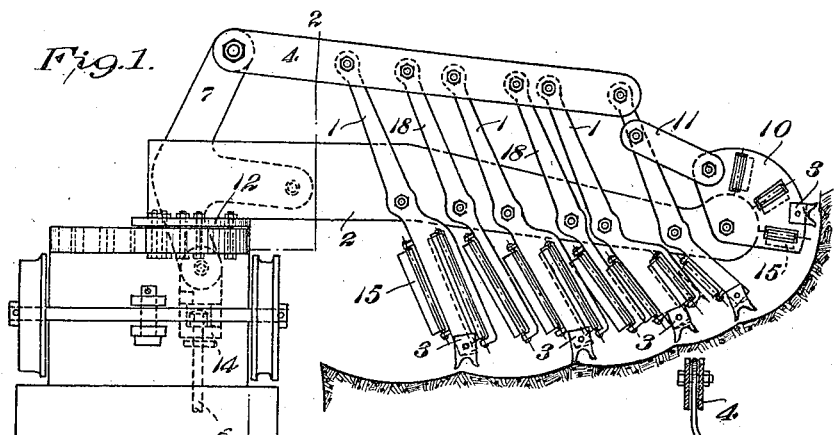
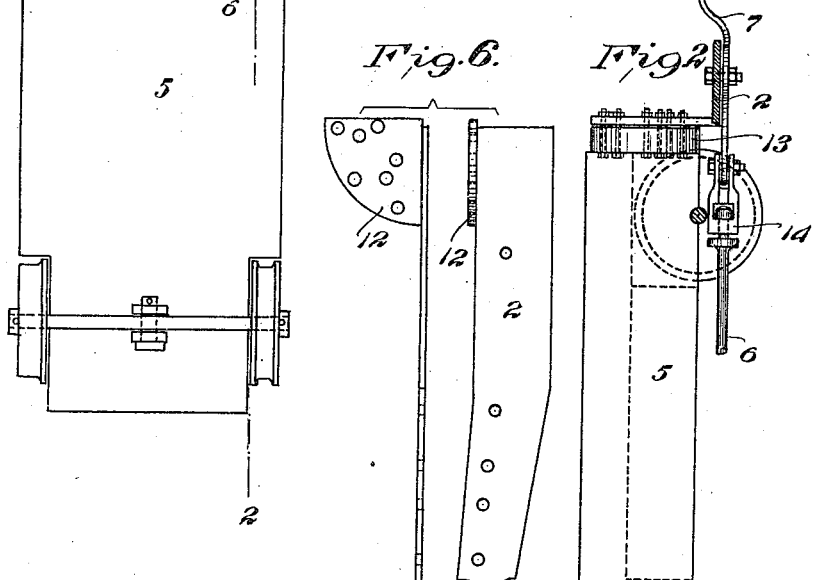
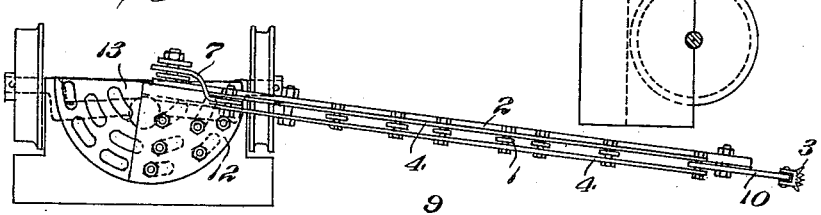
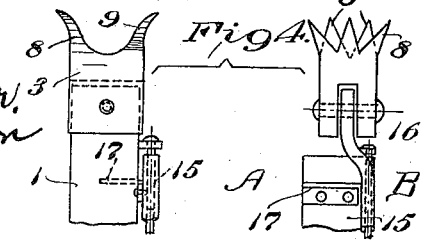
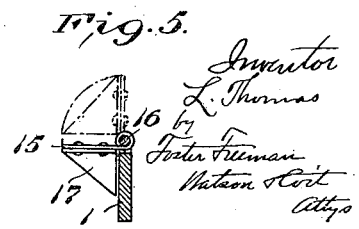

UNITED STATES PATENT OFFICE.

LOUIS THOMAS, OF ANS, NEAR LIEGE, BELGIUM.

COAL-CUTTING MACHINE.

993,474.            Specification of Letters Patent.     Patented May 30, 1911.

Application filed March 19, 1910.   Serial No. 550,356.

*To all whom it may concern:*

Be it known that I, LOUIS THOMAS, manufacturer, subject of the King of Belgium, residing at Ans, near Liege, Belgium, have invented certain new and useful Improvements in Coal-Cutting Machines; and I do hereby declare the following to be a full, clear, and exact description of the invention, such as will enable others skilled in the art to which it appertains to make and use the same.

This invention has reference to coal-cutting machines, and has for its object, to provide a machine in which the tool-carrier has a to-and-fro movement, and which is distinguished from known arrangements by the fact that the said machine is provided with multiple tools or cutters and scrapers mounted upon arms which are fulcrumed to a common support and are actuated by a movement parallel to the layers of coal in such a manner that a continuous or uninterrupted cutting action is insured, as the tools themselves are adapted to make a working cut both in their forward and return movements.

Figure 1 of the accompanying drawings is a plan of the improved machine. Fig. 2 is a view partly in section, substantially on the line 2—2 of Fig. 1. Fig. 3 is an edge view the machine being turned upside down. Fig. 4 shows a side view and a plan, upon an enlarged scale, of one of the cutting tools separately. Fig. 5 is a section of Fig. 4 upon the dotted line A, B. Fig. 6 illustrates in plan and edge view a portion of the support for the cutters.

The coal-cutting part of the machine comprises a series of arms 1, all fulcrumed to the same stationary support 2, and carrying at their extremities, the oscillating double-acting tools or cutters 3. In the example represented, the tool-carrier arms are connected, in common with an actuating bar 4 which receives a reciprocating or to and fro motion from a motor (which is mounted on the carriage 5), by way of a rod 6 and a lever 7, while the carriage itself receives an intermittent advancing movement from any suitable known kind of automatic cutting feed mechanism.

Each of the cutting tools is furnished with two series of teeth 8 and 9, so arranged that they alternately come into operation upon the coal, the one during the movement of the tool-carrier arms in the forward direction, and the other during the movement in the reverse or return direction. To facilitate this double cutting action, each tool 3 is capable of rocking slightly upon the end of its carrier arm, so that they may incline themselves relatively to the said arms as shown in Fig. 1.

Each tool, by the movement as described in the arc of a circle, cuts a groove in the coal of corresponding length simultaneously, and they thereby produce in the coal, a continuous or uninterrupted clearage whose length is the multiple of the number of cutters in action in the machine. To increase the length of the cutting path of the tool which is carried at the extremity of the arm 2, this tool is mounted on a sector 10, which is indirectly controlled from the actuating bar through the medium of the connecting link 11.

In order that the inclination of the support 2 may be varied to adjust the same to the inclination of the layers of coal to be cut, the said support is carried by a sector 12 which is mounted on the part 13 of the carriage 5 and is capable of an angular adjustment thereon in a vertical plane, while to permit of the support 2 and the parts mounted thereon accommodating themselves to the same inclination without interfering with the transmission of motion to the actuating bar 4, a ball joint 14 is arranged between the rod 6 from the motor and the lever 7.

To insure the regular working of the machine and prevent the same being jammed or choked by the accumulation of powdered coal in the paths of the tools, the same is provided with a system of scrapers, whose function is to clear the grooves from the small coal as it is produced by the action of the cutters. These scrapers consists of plates 15, mounted on the tool-carrier arms 1 in such a manner that they may pivot or swing freely about their axes 16. And each plate is provided with a stop 17, which prevents it from completely folding into the plane of the arm and compels it to maintain a position perpendicular thereto.

When the tools are working in the direction indicated by the arrow in Fig. 1, the scrapers adjust themselves to positions (see the dotted lines in Fig. 5) in which they simply trail after the tools over the surface of the coal, but when the said tools commence to make the return movement in the direction indicated by the arrow in Fig. 1, the scraper plates swing into the position relative to the arms as shown in full lines in Fig. 5, and they then effect the removal of the powdered coal from the groove formed by the preceding cut of the tools.

The sector 10 at the extremity of the support 2 may, with advantage, be furnished with several scrapers adapted for clearing out the end of the groove in the coal. Further, with advantage, and for the purpose of insuring the complete clearance of the grooves, supplementary scrapers may be mounted upon arms 18 which are pivoted to the support 2 and worked in unison with the tool carrier arms from the actuating rod 4. As with this arrangement, the rails may be placed parallel to the coal seam, the intermittent advance of the carriage may be effected without it being necessary to displace the said carriage as is the case when the advance is made in a direction normal to the seam, and further, as the motor of the system may be placed outside the seam, the improved coal-cutter may be used in very small space while the fitting up and timbering of the cutting can be easily effected.

Having fully described my invention, what I desire to claim and secure by Letters Patent is:—

1. In a machine of the character described, the combination of a suitable support, an arm extending laterally from the support, a plurality of levers fulcrumed on said arm, a cutting tool pivotally mounted at one end of each lever, and means for simultaneously rocking all of said levers.

2. In a machine of the character described, the combination of a suitable support, an arm pivotally connected with and extending laterally from the support, a plurality of levers each independently fulcrumed on said arm and provided at one end with a cutter, and means connecting and adapted to simultaneously rock said levers.

3. In a machine of the character described, the combination of a wheeled support, an arm mounted at one end of the truck and adapted to rock about a horizontal axis, a plurality of levers fulcrumed on said arm beyond a side of the wheeled support and each having a cutter at one end, and means adapted to vibrate said levers.

4. In a machine of the character described, the combination of a suitable support, an arm extending laterally from the support, a plurality of cutters pivotally mounted on the arm and extending beyond a side edge thereof, a supplemental cutter pivotally connected with the arm and adapted to move in a path about the free end of the arm, and means for vibrating all of the cutters.

5. In a machine of the character described, the combination of a suitable support, an arm extending laterally from the support, a lever fulcrumed on said arm and projecting beyond a side edge thereof, a cutter secured to the end of said lever that projects beyond the supporting arm, a scraper mounted on the lever to rock about an axis extending longitudinally thereof, and means for vibrating said lever.

6. In a machine of the character described, the combination of a suitable support, an arm extending laterally from the support, a plurality of levers fulcrumed on said arm and projecting beyond a side edge thereof, a cutter secured to the end of each lever beyond said arm, a scraper blade hinged to one edge of the projecting section of each lever, a stop for preventing each scraper from swinging beneath its supporting lever, and means connecting and adapted to vibrate all of the levers.

7. In a machine of the character described, the combination of a suitable support, an arm extending laterally from the support, a plurality of levers, each having a cutter at one end, fulcrumed on said arm and so arranged that the cutters are projected beyond a side edge of the arm, a plurality of auxiliary levers fulcrumed on the supporting arm, a scraper hinged to each auxiliary arm, and means connecting and adapted to vibrate all of said levers.

8. In a machine of the character described, the combination of a suitable support, an arm extending laterally from the support, a plurality of levers fulcrumed on said arm and projecting beyond opposite sides thereof, a cutter pivotally connected with one end of each lever, a scraper blade extending longitudinally of each lever between the cutter and said supporting arm, and means connecting said levers on the opposite side of the supporting arm from the cutters for the purpose described.

In testimony whereof I affix my signature in presence of two witnesses.

LOUIS THOMAS.

Witnesses:
C. WILLEM,
G. FLOMTENSE.